Figure 1:
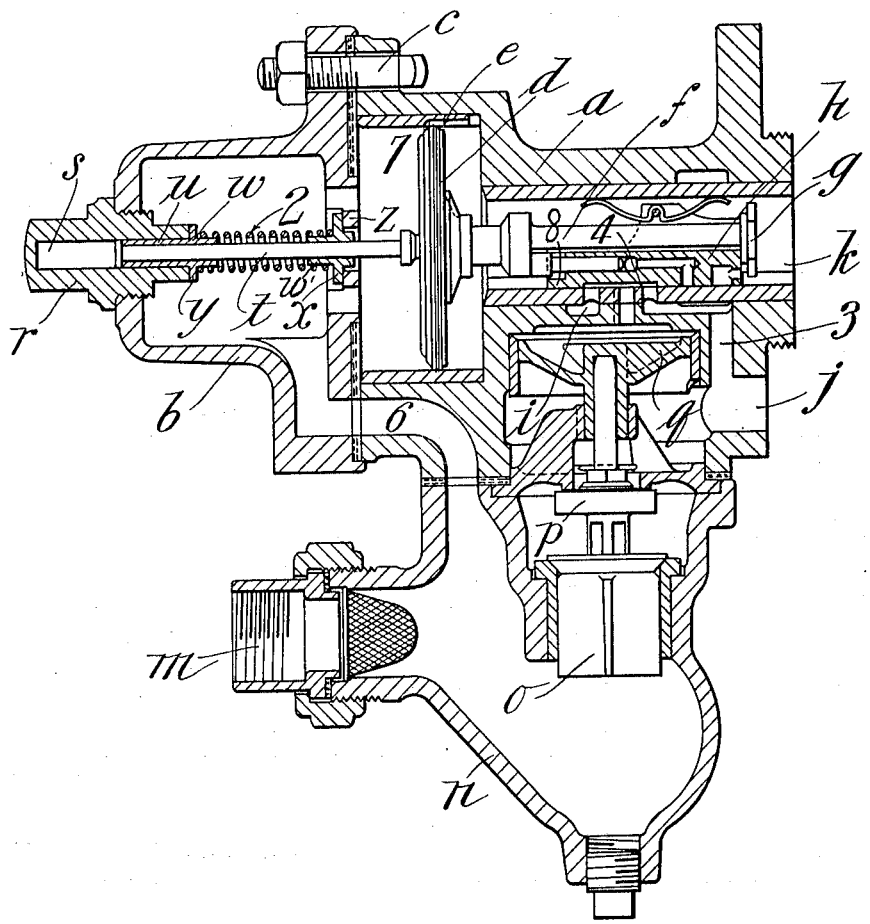

C. H. ATKINS.
TRIPLE VALVE FOR AIR BRAKE SYSTEMS.
APPLICATION FILED SEPT. 15, 1908.

1,053,696.

Patented Feb. 18, 1913.
2 SHEETS—SHEET 1.

WITNESSES:
H. L. Sprague
H. W. Bourn

INVENTOR.
Charles Henry Atkins
BY
Chapin & Co.
ATTORNEY.

C. H. ATKINS.
TRIPLE VALVE FOR AIR BRAKE SYSTEMS.
APPLICATION FILED SEPT. 15, 1908.

1,053,696.

Patented Feb. 18, 1913.

2 SHEETS—SHEET 2.

WITNESSES:
H. L. Sprague
H. W. Bowen

INVENTOR.
Charles Henry Atkins
BY Chapin & Co.
ATTORNEY.

UNITED STATES PATENT OFFICE.

CHARLES H. ATKINS, OF SPRINGFIELD, MASSACHUSETTS, ASSIGNOR TO KLEENSWEEP MANUFACTURING COMPANY, OF SPRINGFIELD, MASSACHUSETTS, A PARTNERSHIP.

TRIPLE VALVE FOR AIR-BRAKE SYSTEMS.

1,053,696.     Specification of Letters Patent.     Patented Feb. 18, 1913.

Application filed September 15, 1908. Serial No. 453,168.

*To all whom it may concern:*

Be it known that I, CHARLES H. ATKINS, a citizen of the United States of America, residing at Springfield, in the county of Hampden and State of Massachusetts, have invented new and useful Improvements in Triple Valves for Air-Brake Systems, of which the following is a specification.

My present invention relates to improvements in triple valves as employed in automatic air-brakes.

The particular object of the invention resides in means for preventing the escape or loss of air to the atmosphere from the brake cylinders when the auxiliary reservoirs are being recharged from the brake-pipe.

In the ordinary operation of the triple valve it has been the common practice to allow the air to escape from the brake cylinder during or when the auxiliary reservoirs are being recharged from the train-pipe, resulting in great loss of efficiency of the braking apparatus. By permitting the air to escape from the brake cylinder during the re-charging of the auxiliary reservoirs it sometimes results in the train getting beyond control, especially is this the case with long freight trains on heavy grades. The present exacting conditions of handling heavy freight trains render it extremely necessary that every precaution be taken in order to utilize all of the compressed air contained in the apparatus. Attempts have been made to remedy defects in the braking system by employing what is known as the "retarded release and re-charging position" of the triple valve, by which term is meant that the air in the brake cylinder, instead of being permitted to fully and quickly escape to the atmosphere, is prevented from doing so by providing a small opening for the air to escape from the brake-cylinder, and at the same time provide means for re-charging the auxiliary reservoir.

Broadly stated, therefore, my invention consists in providing means to effectively close the exhaust port from the brake cylinder to the atmosphere while at the same time air is flowing from the brake-pipe into the auxiliary reservoir through the usual feed groove.

A further object of the invention is in the provision of but one release position but whether it will stop or come to rest in this position or not depends upon how the brake-pipe pressure is increased,—if slowly, the ports will go to full release, if quickly, the slide valve will instantly flash by the exhaust port opening and the lap on the slide valve will cover the port preventing all escape of air from the brake cylinder, and at the same time air from the train-pipe is flowing into the auxiliary reservoir through the feed groove in the usual way, but in this position of the piston through a more restricted opening than when in release position, and when the pressures in the train-pipe and auxiliary reservoirs are equalized the piston will move so as to pull the slide valve back into release position. In order to bring about the movement of the piston when the pressures on the opposite sides are equal, I provide a spring construction located at one end only of the valve or piston-stem. During this operation the brakes on the rear end of the train have not moved to re-charging brake-set position because the pressure in the train-pipe on the rear part of the train is less than the pressure on the head end of the train due to friction in the brake-pipe and its connections, and is not sufficient to compress the spring referred to. The brakes on the rear portion of the train will release first and those on the head end last. On steep grades the engineer can, by proper manipulation of the train-pipe pressures, re-charge all of the auxiliary reservoirs even with the longest trains without the necessity of releasing any of the brakes; the train-pipe pressure being then raised to its highest point and kept there until just before the pressures in the train-pipe and auxiliary reservoirs are equalized, when service application should again be made thus making the use of retaining valves unnecessary, as will be fully described in the specification and particularly pointed out in the claims.

Figure 2:
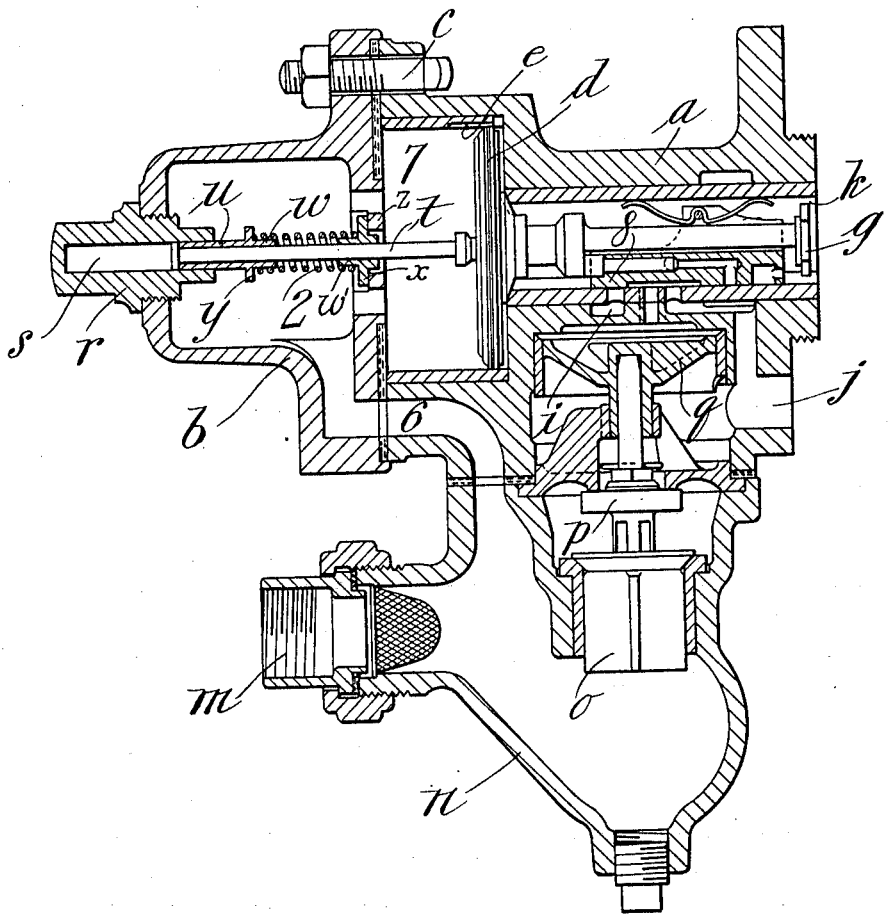

In the drawings forming part of this application,—Figure 1 is a vertical longitudinal sectional view through the piston-stem showing the parts in release position. Fig. 2 is a section through the same parts showing the triple valve when the brakes are on and the auxiliary reservoirs are being recharged.

Referring to the drawings in detail, *a* designates the valve-body; *b* a bracket member secured thereto by means of the bolts *c*, the usual piston being shown at *d* and a feed groove at $e$, but much smaller than those in common practice, the valve-stem being indicated at $f$ with the shoulder portion $g$ for moving the slide-valve $h$.

$i$ designates the exhaust port for the brake cylinder which is connected at $j$, the auxiliary reservoir being connected at $k$, and the brake or train pipe at $m$ which leads into the usual check-valve casing $n$, the check-valve and emergency valve being shown at $o$ and $p$, respectively, and the emergency piston at $q$.

The parts above mentioned are, in general, those of the "Westinghouse" type of automatic brake as at present used.

Referring now specifically to my improvements as related to the above referred to parts: $r$ designates an adjusting nut threaded into the bracket $b$ which nut is provided with an opening $s$ for receiving the end of the stem $t$ and the cylindrical portion $u$ of the sleeve $w$.

$y$ designates a collar integral with the cylindrical portion $u$.

$w^1$ designates a second sleeve surrounding the stem $t$ and having a bearing on the shoulder $z$ and a collar $x$.

Located between the sleeves $w$ and $w^1$ is the spring 2, the purpose of this spring being to move the piston $d$ from its position shown in Fig. 2 to that shown in Fig. 1, when the pressures on opposite sides of the same become equal as will be described later in reference to the operation of the improvement. The position of the parts shown in Fig. 1 represent those when the brakes are being released and the auxiliary reservoir is being charged. The air from the brake cylinder at this moment passes through the opening $j$ by way of the passage 3 and the exhaust cavity 4 in the slide-valve $h$ and to the atmosphere through the exhaust port $i$. At the same time air is passing from the brake-pipe to the coupling $m$ to the check-valve casing $n$ through the passage-way 6 and into the chamber 7, then through the small feed groove $e$ to the opposite side of the piston $d$ and from thence to the auxiliary reservoir which is connected at $k$. If it is desired to re-charge the auxiliary reservoir and at the same time maintain the brakes applied, the engineer quickly raises the pressure in the train or brake-pipe, which operation causes the piston $d$ to be thrown into the position shown in Fig. 2, which operation will cause the slide-valve $h$ to flash by and cover the exhaust-port $i$, the slide-valve then being in lap position, as shown in this figure, thus covering the port $i$ and preventing the brake cylinder exhausting to the atmosphere. The lap portion of the valve is indicated at the numeral 8. When the parts are in this position, the air from the brake-pipe will pass into the check-valve chamber $n$ and through the passage-way 6 and from there to the chamber 7, and through the feed groove $e$ to the auxiliary reservoir that is connected at $k$. The piston $d$ will remain in this position until the pressure on opposite sides of the same is equal, and at this point the spring 2 will then recoil from the position shown in Fig. 2 to that shown in Fig. 1. By properly manipulating the engineer's brake valve, the pressure in the train-pipe may be so varied that all of the auxiliary reservoirs to the last car of a long train may be re-charged without releasing any of the brakes.

It is understood that on account of the friction of the air in the brake-pipes the pressure at the rear of the train is less than the pressure at the head of the train. It will therefore be seen that by the employment of the spring 2 and the collars $y$ and $x$ that the triple valve has but one release position which is that shown in Fig. 1, and therefore the brakes at the rear end of the train will come off first and those at the head end last, thereby preventing undue shock or jar to the train during the release of the brakes; and, as stated, by proper manipulation of the brake-pipe pressures on a steep grade, all of the auxiliary reservoirs may be re-charged with the brakes on, which would greatly increase the efficiency of the braking system. By maintaining the pressure in the train-pipe until the pressures on opposite sides of the piston $d$ are equal, the engineer can then make a regular service application, permitting the air to flow from the auxiliary reservoir to the brake cylinder, and this second application would of course be made with the pressure from the auxiliary reservoir greater than the preceding application, whereby the train would be maintained under full control and without any loss of air and also without its being necessary to use retaining valves.

It will therefore be seen that I have provided a very simple and reliable means for re-charging all of the auxiliary reservoirs when the brakes are on and without loss of any of the air in the brake cylinders, and also one that will permit a re-charging of all the auxiliary reservoirs, even in long freight trains and on heavy grades.

What I claim, is:—

1. A fluid pressure brake mechanism having in combination with the auxiliary reservoir, brake-pipe, and brake-cylinder, a valve casing having an exhaust port therein, a piston, a slide valve operable thereby, a stem secured to the piston, a sleeve carried by the stem and having an abutment thereon, a second sleeve carried by the stem and having an abutment thereon, and an expansible spring located between the abutments, whereby when the pressures in the brake-pipe and auxiliary reservoirs are equal the slide valve will be operated by the spring and the brakes released, and the auxiliary reservoir will be re-charged when the brakes are applied, as described.

2. In a triple valve, a piston, a slide valve operated thereby, a spring loosely attached to said piston so that said piston may move through a limited stroke without being affected by said spring, and means whereby at either end of said limited stroke, said spring resists motion of the piston.

CHARLES H. ATKINS.

Witnesses:
K. I. CLEMONS,
HARRY W. BOWEN.

Copies of this patent may be obtained for five cents each, by addressing the "Commissioner of Patents, Washington, D. C."